April 25, 1950     H. C. RIGGS     2,505,207
NONSPILL STORAGE BATTERY
Filed Nov. 14, 1945     2 Sheets-Sheet 1
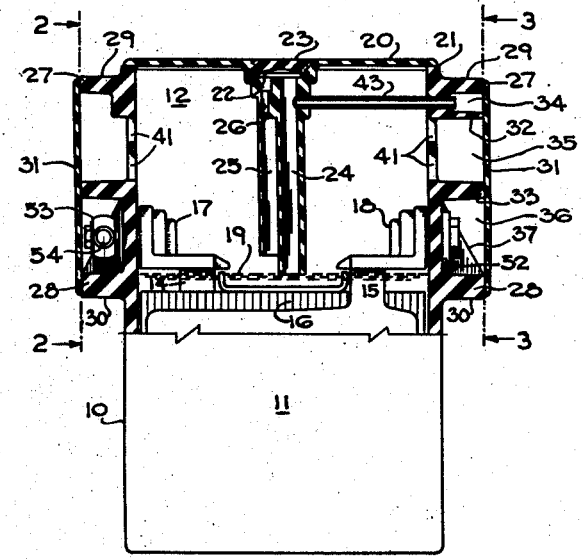
INVENTOR
HAROLD COLEMAN RIGGS
BY
Augustus B. Staughton
ATTORNEY

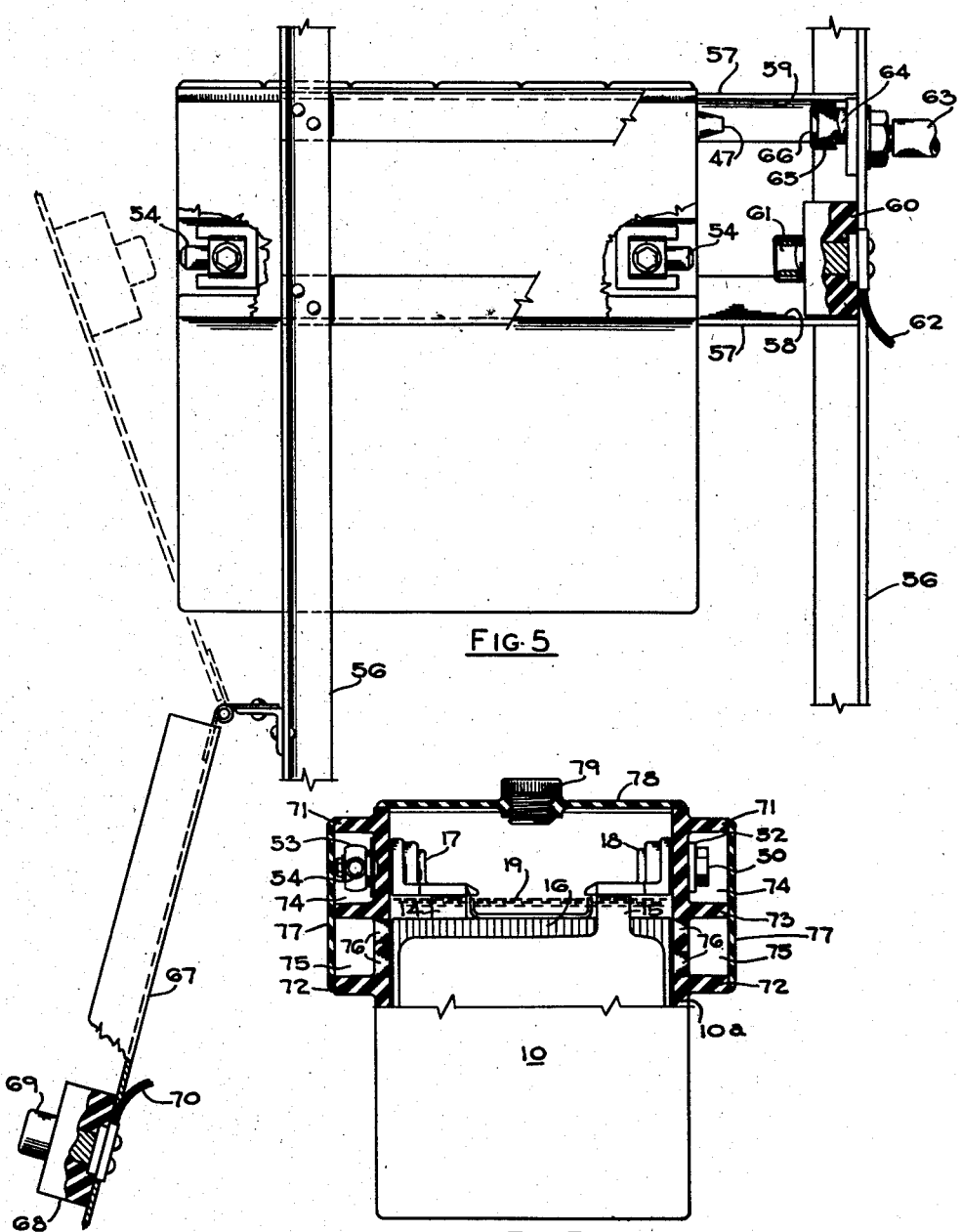

Patented Apr. 25, 1950

2,505,207

UNITED STATES PATENT OFFICE 2,505,207

NONSPILL STORAGE BATTERY

Harold Coleman Riggs, Langhorne Manor, Pa., assignor to The Electric Storage Battery Company, a corporation of New Jersey Application November 14, 1945, Serial No. 628,477

15 Claims. (Cl. 136—170)

This invention relates to storage batteries and more particularly to portable batteries of the single or multiple cell type which may have incorporated therein the so-called "double chamber" type non-spill construction.

In accordance with this invention there is provided a new and improved storage battery which has projections on opposite walls thereof forming an integral support which makes it possible to install or remove the battery quickly and simply without the use of special tools. The projections are subdivided into a plurality of compartments. In one of these compartments is housed the terminal connectors and, in the case of the multiple cell battery, the intercell connectors which are connected to group terminals projecting through the side wall of the battery into the connector compartment. In this manner the weight of the battery is reduced and the surfaces of the battery, including the top surface, are free from obstructions, such as connectors, posts, and the like. Another of the compartments is provided with openings communicating with the interior of the battery or the interior of each cell of a multicell battery. Thus increased electrolyte space is obtained with no increase in height, or, expressed differently, the height of a single or multiple cell battery may be reduced without sacrificing electrolyte space. Still another of the compartments in at least one of the projections is constructed to serve as a vent manifold for venting all of the cells of a multiple cell design through a common duct. All of these features are embodied in a battery container which can be produced accurately and quickly and at relatively low cost from thermoplastic materials which can be molded. Moreover, the construction of the container is such as to permit the battery to be assembled readily and relatively inexpensively.

Further, in accordance with this invention, there is provided a relatively simple supporting structure for supporting the battery having the features described above. In combination with the battery the supporting frame is provided with means for automatically making electrical and vent connections when the battery is inserted into its normal position on the support.

Thus it is the object of this invention to provide a new and improved portable battery which is more compact, weighs less and is relatively freer of external obstructions than comparable types heretofore produced. It is a further object of this invention to provide such a battery which may be simply and easily mounted on or removed from simplified mounting, securing and connecting means.

Specific objects and advantages of this invention will become apparent as the following detailed description proceeds and the features of novelty which characterize this invention will be set forth in the claims appended to and forming a part of this specification:

In the drawings, Figure 1 is a front elevation partly broken away and partly in section of a portable battery incorporating the features of this invention;

Figure 2 is a view taken on the line 2—2 of Figure 1;

Figure 3 is a view taken on the line 3—3 of Figure 1;

Figure 4 is an enlarged sectional view of the right hand rail of the battery shown in Figure 1;

Figure 5 is a side elevation showing the battery of Figure 1 mounted in accordance with this invention in a frame permitting, in cooperation with the novel features of the battery, ready mounting, securing and connection of the battery;

Figure 6 is a fragmentary view showing details of the cooperating mounting rails of the battery and frame shown in Figure 5; and Figure 7 is a view similar to Figure 1 showing a portable battery embodying a modification of this invention.

Referring to the drawings and particularly Figures 1–4, the features in this invention are shown embodied in a so-called double chamber type non-spill multiple cell battery having a container 10 provided with a lower chamber 11 and an upper chamber 12 and divided by cell-forming partitions 13 (Figure 2). Provided in the lower chamber are the usual positive plate groups 14, negative plate groups 15 and separators 16. The plate groups are burned to respective group terminals 17 and 18 and the plates and separators are covered with electrolyte to the level indicated by the dotted line 19 (Figure 1). Each cell is closed by a cover 20 hermetically sealed to the cell walls at 21 and provided near the center with a filling well 22 closed by an imperforate plug 23.

As is understood in the art, the upper chamber of the double chamber construction of each cell compartment is designed to accommodate electrolyte when the battery is inverted. In order to provide a suitable vent for the gases of the battery and at the same time prevent spillage of electrolyte when the battery is tilted or inverted, it is customary to provide a standpipe which communicates with the filling well 22 and extends sufficiently far down into the upper chamber so that the lower end thereof will not be covered by electrolyte irrespective of the position of the battery. There is illustrated in Figure 1 an improved filling and venting structure for batteries of this type which includes a non-overfill feature as well as the non-spill feature and venting feature. The novel features per se of this combined filling and venting structure are not claimed herein as they are the subject matter of co-pending application Serial No. 628,567, filed by Lester E. Lighton, on November 14, 1945, now U. S. Patent No. 2,472,852, and assigned to the assignee of this application.

Briefly, however, the filling and venting structure comprises two filling and venting ducts 24 and 25. The duct 24 extends from the filling well 22 down to the normal electrolyte level. The duct 25 extends from the filling well down to within a short distance of the end of duct 24. The duct 25 is provided near its upper end with a short section 26 of reduced diameter to prevent liquid passing down through this duct during a filling operation from filling the lower portion of duct 25. This construction produces a non-overfill filling and venting device for the double chamber type non-spill construction, all as more particularly described and claimed in the above referred to co-pending application. It is sufficient to state here that by means of the construction illustrated, overfilling beyond the normal electrolyte level is avoided and at the same time a suitable non-spill venting arrangement is provided.

As previously set forth, this invention relates to providing a battery the outer surfaces of which are relatively free of obstructions and which is compact and may be readily mounted and removed from a support. In accordance therewith there is provided on opposite side walls of the battery container 10, adjacent the top thereof, longitudinal projections of generally rectangular or channel shaped cross-section. These projections are shown integrally molded with the container side walls. In the preferred form of this invention the container is molded from a synthetic thermoplastic resin such as polystyrene or methyl methacrylate and the projections are integrally molded therein. It is to be understood, however, that the container can be made up from prefabricated parts cemented together with a suitable solvent in which case the projections would be bonded to the container side walls. Moreover, the container could be molded from a suitable rubber compound.

The projections consist of longitudinally extending upper and lower flanges 27 and 28 having respectively horizontal upper and lower faces 29 and 30. Extending across these webs is a cover plate 31 which is hermetically sealed to the webs by a suitable cement. Thus there is provided a projection extending the length of the battery defining a chamber on opposite sides of the battery bounded by the adjacent side walls of the battery, the cover plate, and the webs, the projection being sufficiently strong to support the battery and hold it against vertical movement in combination with a supporting frame more particularly described hereinafter.

Provided in the chamber formed in the projection on one side of the battery, the right side as shown in Figure 1, are two longitudinally extending partitions 32 and 33 dividing the chamber into three longitudinally extending compartments 34, 35 and 36. As shown in Figure 4, compartment 34 is unobstructed and forms a continuous duct extending the length of the battery. Likewise the compartment 36 is in the form of a duct extending the length of the battery but it is obstructed at spaced intervals by strengthening webs 37.

The compartment 35 on the other hand is subdivided by a plurality of partitions 38 including end partitions 39 which extend over the end of duct 34. The partitions 38 coincide with the partitions 13 of each cell of the battery and the end partitions 39 coincide with the end walls of the battery. There is thus formed a series of rectangular pockets 40. Provided in the adjacent side walls of the container forming a part of the pockets 40 are a pair of openings 41 providing communication between the pocket and the interior of the cell. Thus the pockets 40 provide space for electrolyte permitting the height of the battery to be reduced without sacrificing electrolyte space in the upper chamber or interfering with the non-spill feature of the battery.

Provided in the compartment 34 are a plurality of spaced openings 42, each opening communicating with a cell of the multi-cell construction. Cemented in these openings 42 are tubes 43, the opposite ends of which communicate with and are cemented in an opening in the side wall of the duct 24. Through this construction each cell of the multi-cell battery is vented to a common vent duct. Gases evolved in each cell escape via either duct 24 or 25 and pass out through the tube into the vent manifold. Provided in the end wall of the manifold is a tapered nipple 47 which is adapted to be connected automatically to an external lead-off duct as more fully described hereinafter. It is to be understood that the vent manifold 34 may be positioned on either side of the battery. If complete interchangeability is desired, a vent manifold may be provided on both sides of the battery.

The connector duct 36 is likewise provided with openings 48 (Figure 4) extending through the side wall of the container. The openings 48 are positioned so as to be in alignment with the group terminals 18 of each cell of the multi-cell construction. These group terminals are provided with a vertically upstanding portion in which is molded an insert 49 externally threaded so as to provide greater adhesion between the outer surface of the insert and the surrounding lead. Projecting through the opening 48 in the side wall and engaging the internal thread of the insert 49 is a connector post 50. In order to provide a fluidtight seal at the opening 48 in the side wall of the battery container, a rubber gasket 51 is provided around the connector post 50 between the group terminal and the inner surface of the side wall of the container. The connector post 50 is in the form of a bolt having a hexagonal head. Lying under this head and secured thereby against the outer side wall of the container are the intercell connectors 52 or the terminal connectors. Thus when the connector post is threaded into the insert 49 the gasket 51 is compressed so as to provide a fluidtight seal preventing the escape of electrolyte into the connector duct and protecting the outer portion of the connector post from corrosion. In order to obtain the mechanical strength and the electrical conductivity required the conector post 50 and the insert 49 in the group terminals are made of copper.

As shown in Figure 2, the terminal connections for the battery are located at opposite ends of the connector duct 36 extending along one side of the battery due to the fact that a battery having an even number of cells is illustrated. If the number of cells are odd, obviously one terminal connector must be located in the connector duct on each side of the battery. These terminal connections consist of a block 53 having an opening therethrough, through which the connector post 50 extends and projecting laterally from the block perpendicular to the opening therethrough is a stud 54 which is adapted to cooperate with external circuit connections as more fully described hereinafter. Block 53 and stud 54 are preferably of copper or brass, although any conductive material having the desired mechanical properties is suitable.

The projection on the left side of the battery is similar to that formed on the right side and like numerals have been used to designate like parts. The chambers formed therein, however, differ in that the partition 32 of the right hand projection is eliminated and the vent manifold 34 is thereby eliminated.

With reference to the connector ducts 36, it is to be noted that the webs 37 are alternately positioned in the ducts on opposite sides of the battery. The webs are thus arranged so as to accommodate the intercell connections required for connecting the cells of the multiple cell battery in series.

In assembling the battery described in detail above, the container is molded or fabricated with its longitudinally extending projections subdivided as described. The openings are then drilled through the side walls of the container bounding the various ducts or compartments. With the container thus fabricated, assembled elements consisting of positive and negative plate groups burned to positive and negative plate terminals and separators are inserted in each cell of multicell container. Next the gaskets 51 are mounted in position and the connector posts 50 are threaded through the intercell or terminal connectors, the appropriate opening 48, the gasket 51 and into the insert 49 of the appropriate group terminal. Tightening the connector post produces good electrical contact and compresses the gasket 51 to produce a fluidtight seal.

The cover 20 and the filling and venting structure are separately molded or fabricated as a unitary construction with the tubes 43 cemented into the side wall of the duct 24. This assembly is then mounted on each cell of the battery, the mounting being accomplished cocking the cover so that the tube 43 enters the opening into the vent manifold 34. The cover is then brought down into position and is cemented to the adjacent top portions of the wall and partitions of the battery, the cement preferably being applied to one or both contacting surfaces just prior to assembly. In addition the tubes 43 are cemented at 55 to the adjacent side wall of the container. When these operations have been completed the plate 31 is cemented to each of the projecting flanges and partitions forming the longitudinal projections thereby closing each of the chambers or pockets formed by the flanges and partitions.

The construction described lends itself to simplified fabricating and assembling techniques. Modifications could be made in the embodiment described without materially altering its salient features. For example, instead of drilling the openings 41 in the elecrolyte pockets or chambers 40, a single opening might be provided for each chamber and this opening so designed so as to be molded directly in the container. Moreover, it should be understood that if desired the plate 31 could be so constructed as to close only the vent manifold and electrolyte pockets leaving the connector duct exposed. With such a construction the plate 31 could be molded integrally with the container.

Figures 5 and 6 illustrate the improved simplified mounting construction desirable for supporting and making external connections to the improved battery construction described above. This mounting construction consists of a frame having vertical angle members 56 to which are secured horizontally extending rails 57. These rails are mounted in pairs on opposite sides of the frame and, as shown in Figure 6, each pair consists of angle members positioned to provide laterally extending horizontal faces. The lower face 58 is provided to engage the lower horizontal surface 30 of the battery to support the battery in position and the upper face 59 is positioned so as to be engaged by the horizontal upper surface 29 of the battery but to be spaced a slight distance from this surface. Thus the projections provided on the battery are constructed to slide between the oppositely positioned pairs of rails and the battery is thereby supported and held down on the rails.

Secured to one of the rear vertical angle members 56 and insulated therefrom is a terminal block comprising base member 60 of insulating material in which is mounted a socket 61 electrically connected to an external circuit connection 62. The insulating block 60 is positioned with respect to the rails so that it will be engaged by the end wall of the battery and act as a stop therefor. Provided on the opposite rear vertical member 56 above the terminal block is an external vent tube 63 which is provided with a tube section 64 having a cap 65 in which is an inwardly tapering opening 66. The terminal socket 61 and the vent socket formed by the cap 65 and opening 66 are positioned so that when the battery is pushed into position against the stop formed by the insulating block 60 the terminal stud 54 and the vent nipple 47 of the battery will respectively engage and make a good electrical and mechanical connection respectively with the terminal and vent sockets.

Hinged to the front vertical members 56 of the frame is a door 67 upon which is mounted an external circuit connector comprising an insulating base member on block 68 and a socket 69 electrically connected to a lead 70. The socket 69 is adapted to make electrical connection with the terminal stud 54 at the front end of the battery. The door 67 is adapted to be latched in the closed position by any suitable latching means (not shown) and when it is swung to the closed position and latched the electrical connections to the battery are completed and the battery is held against any horizontal movement. It will thus be seen that the features of the battery construction make it possible to provide a relatively simple supporting frame on which the battery will be secured either against vertical or horizontal movement and to which electrical and vent connections can be automatically made when the battery is mounted in its normal position on the supporting frame.

Referring to Figure 7, there is shown a modified form of battery incorporating certain of the features of this invention. In particular there is illustrated a conventional type single chamber (as distinguished from double chamber) starting, lighting and ignition battery 10 incorporating certain features of this invention. It will be observed that the battery consists of the usual container in which are located positive and negative plate groups 14 and 15 and separators 16. The normal electrolyte level is shown by the dotted line 19. The positive and negative plate groups are burned to group terminals 17 and 18 identical to those described and illustrated in Figure 1.

Molded in or otherwise secured to the side walls 10a of the battery are longitudinally extending projections formed by upper and lower substantially horizontal flanges 71 and 72. Positioned between these flanges is a third flange or partition 73 which forms a pair of ducts 74 and 75. The upper duct is arranged to form a terminal or inter-cell connector duct exactly as described above in connection with Figure 1 and the lower duct is constructed to form, in a multi-cell battery, a series of pockets which communicate by means of openings 76 with the interior of the battery cell thereby providing electrolyte space at the tops of the plates. Cemented to the flanges and partitions of the longitudinal projections are cover plates 77 which provide for the complete enclosing of the terminal ducts and the electrolyte chambers and presents a smooth outside surface for the battery. Closing the battery cell is a cover 78 which is provided with the usual vent plug 79. It is clear that a battery thus constructed may be readily assembled and quickly and easily mounted as has been already described. In addition, the construction illustrated produces a battery which is compact without sacrificing of electrolyte space and is free from exposed projections such as inter-cell connectors, terminal posts and the like.

While specific modifications and embodiments of this invention have been described and illustrated, additional modifications will undoubtedly occur to those skilled in the art. It is therefore contemplated in the appended claims to cover all such modifications as come within the true spirit and scope of this invention.

I claim:

1. In a storage battery provided with plate groups and group terminals, the combination of a container, a plurality of super-imposed compartments externally associated with opposite side walls of said container, the upper face of the upper compartment and the lower face of the lower compartment providing means for supporting said container on mounting rails, means providing communication between one of said compartments and the interior of the battery to provide increased electrolyte space, and terminal posts projecting through said side walls of said container into another of said compartments so that connections thereto are housed in said compartment.

2. In a storage battery provided with plate groups, group terminals, electrolyte and a container therefor, the combination of longitudinally extending channel-like members on opposite side walls of said container and forming a part thereof, longitudinally extending partitions between said channel-like members, a vertical face plate covering said channel-like members and said partitions whereby a plurality of compartments are formed, communicating openings through the side wall of said container into one of said compartments whereby electrolyte in said container can overflow into said compartment, communicating openings through the side wall of said container into another of said compartments, terminal posts projecting through said last mentioned openings and engaging said group terminals, and means providing a liquid tight seal between said terminal posts and the adjacent portion of said side wall of said container.

3. In a storage battery having plate groups, group terminals, a container therefor, and liquid electrolyte in said container, the combination of lateral longitudinal projections on opposite walls of said container and forming a part thereof, partitions extending substantially parallel to said projections, a cover plate covering said projections and said partitions thereby forming a plurality of compartments, openings through the adjacent part of the container wall bounding each of said compartments to provide communication between the interior of said container and each of said compartments, terminal means engaging said group terminals projecting through said openings into one of said compartments and sealed to said adjacent container wall whereby the terminals of said battery are housed in said compartment, another of said compartments providing added space for electrolyte.

4. In a multicell storage battery provided with plate groups, group terminals and intercell connectors the combination of a container divided by transverse partitions into a plurality of compartments for housing said plate groups, said container provided with lateral longitudinal projections on opposite side walls having downwardly facing shoulders for supporting said battery, a longitudinal duct in each of said projections housing the intercell and terminal connectors of the battery, openings through the side walls of said container providing communication between said ducts and the interior of each of said plurality of compartments, said openings registering with the group terminals in said compartments, and conducting members passing through but sealed with respect to said openings and connecting the group terminals with the intercell connectors.

5. In a multicell storage battery provided with plate groups, group terminals and intercell connectors the combination of a container divided by transverse partitions into a plurality of compartments for housing said plate groups, said container provided with lateral longitudinal projections on opposite side walls having downwardly facing shoulders for supporting said battery, a series of pockets in each of said projections each pocket opening into one of the compartments near the top thereof, a longitudinal duct in each of said projections housing the intercell and terminal connectors of the battery, openings from said last mentioned duct into the several compartments registering with the group terminals, and conducting members passing through but sealed with respect to said openings and connecting the group terminals with the intercell connectors.

6. A multicell non-spill storage battery of the double chamber type having plate elements assembled with suitable electrolyte in a container divided by transverse partitions into a plurality of compartments for said elements, each compartment provided with a cover having filling and venting ducts, one of said ducts extending down to the normal electrolyte level, said container having longitudinal lateral projections on opposite side walls near the top providing downwardly facing shoulders for supporting said battery, at least one of said projections having a longitudinal vent duct, a vent tube connecting the upper end of each filling and venting duct with said longitudinal vent duct, a longitudinal series of pockets in each of said projections each opening into one of said compartments above the normal electrolyte level and constructed to provide space for electrolyte when the cell is inverted, a longitudinal connector duct in each of said projections provided with openings through the container wall into the several compartments, terminals for said plate elements registering with said openings, intercell connectors housed in said connector duct for connecting the plate elements in adjacent cells, said connectors having portions overlying the corresponding openings into adjacent cells, and a conducting member passing through but sealed with respect to each opening connecting said plate element terminal with the corresponding intercell connector.

7. A multicell storage battery having plate elements assembled with suitable electrolyte in a container divided by transverse partitions into a plurality of compartments for said elements, each compartment provided with a cover having filling and venting ducts, one of said ducts extending down to the normal electrolyte level, said container having longitudinal lateral projections on opposed sides near the top providing downwardly facing shoulders for supporting said battery, at least one of said projections having a longitudinal vent duct, and a vent tube connecting the upper end of each filling and venting duct with said longitudinal vent duct.

8. A storage battery container including a bottom and upstanding, rectangularly related walls defining at least one cell compartment, longitudinally extending means projecting from opposed walls for supporting the container, and at least one duct within said longitudinally extending means and communicating with the interior of the cell compartment.

9. In a container for a multicell storage battery divided by transverse partitions into a plurality of individual cell compartments the combination of lateral projections on opposite sides of the container near the top, said projections being of substantially rectangular cross section to provide downwardly facing shoulders, a longitudinal series of pockets in each of said projections, each pocket opening into one of the individual cell compartments, and a longitudinal intercell connector duct in each of said projections provided with openings through its wall into the individual cell compartments adapted to receive a cell connector bolt, said projections, with their pockets and intercell connector ducts being symmetrically identical on opposite sides of the vertical median longitudinal plane of the container.

10. A container for a multicell battery comprising side walls, end walls and a bottom wall and having partitions therein for dividing the container into a plurality of compartments for receiving the elements and electrolyte to form cells, a longitudinally extending projection on each side wall of said container adjacent the top portion thereof, a plurality of openings in each of said projections communicating with the interior of each of said cells adjacent the upper portion thereof, a duct in each of said projections lying below said first mentioned openings for receiving the terminal lugs of each cell and intercell connectors, said duct being normally open to the exterior of the battery for assembling, and a second duct in at least one of said projections lying above said first mentioned openings and in communication with the interior of each cell for venting the gases produced in the cell, said projection on each side of said battery having horizontal faces for supporting said battery in position.

11. In combination a storage battery having longitudinal projections on oppositely facing side walls, a vent duct and terminal connections housed in said projections, quick connecting means on both said vent duct and said terminals, a frame having rails for receiving said projections to support said battery on said lower faces of said projections and to restrain said battery against vertical movement by engagement with the upper faces of said projections, and external circuit and vent connections mounted on said frame to receive said vent duct and terminal connecting means when said battery is positioned on said rails.

12. In combination with a multicell storage battery including longitudinally extending support means projecting from opposed side walls, intercell connectors housed within said support means, and terminals adjacent opposite ends of said support means, a carrier including rails engaging opposed faces of said support means and thereby slidably supporting the battery and retaining it against upward movement, stop means on said carrier engaging the battery to limit inward sliding movement, a conductor fixed to said carrier and engaging one of said terminals, means hinged to said carrier and engaging the battery to confine the latter, and a conductor on said hinged means engaging said other terminal.

13. In combination with a multicell storage battery including longitudinally extending support means projecting from opposed side walls, intercell connectors housed within said support means, and terminals adjacent opposite ends of said support means, a carrier including rails receiving said support means and supporting the battery, a conductor fixed to said carrier and engaging one of said terminals, means hinged to said carrier and confining the battery, and a conductor fixed to said hinged means engaging the other of said terminals.

14. A multicell storage battery including a container defining cell compartments and having longitudinally extending support means projecting from opposed side walls, intercell connectors housed within said support means, and terminals adjacent opposite ends of said support means, said support means containing ducts communicating with the interior of the cell compartments and adapted to receive electrolyte.

15. A multicell storage battery including a container defining cell compartments and having longitudinally extending support means projecting from opposed side walls, intercell connectors housed within said support means, and terminals adjacent opposite ends of said support means, said support means containing ducts communicating with the interior of the cell compartments and adapted to receive electrolyte, one of said support means having an additional duct communicating with the interior of the cell compartments for venting the cells.

HAROLD COLEMAN RIGGS.

(References on following page)

REFERENCES CITED

The following references are of record in the file of this patent:

UNITED STATES PATENTS

| Number | Name | Date |
|---|---|---|
| Re. 22,833 | Sandusky | Jan. 21, 1947 |
| 1,993,893 | Page | Mar. 12, 1935 |
| 2,206,306 | Sager | July 2, 1940 |
| 2,252,633 | Jones et al. | Aug. 12, 1941 |
| 2,296,778 | Emanuel | Sept. 22, 1942 |
| 2,379,189 | Rupp | June 26, 1945 |

FOREIGN PATENTS

| Number | Country | Date |
|---|---|---|
| 133,803 | Great Britain | Oct. 23, 1919 |
| 4,234 | Great Britain | of 1903 |
| 375,333 | Italy | Oct. 3, 1939 |